United States Patent
Jensen et al.

(10) Patent No.: US 7,165,530 B2
(45) Date of Patent: Jan. 23, 2007

(54) METHOD FOR CONTROLLING A VARIABLE-SPEED ENGINE

(75) Inventors: Jeffrey Edward Jensen, Naperville, IL (US); Marvin Kent Palmer, Bloomington, IL (US); Lisa Marie Christopherson, South Elgin, IL (US); Joel Robert Frerichs, Chillicothe, IL (US)

(73) Assignee: Caterpillar Inc, Peoria, IL (US)

( * ) Notice: Subject to any disclaimer, the term of this patent is extended or adjusted under 35 U.S.C. 154(b) by 0 days.

(21) Appl. No.: 11/141,063

(22) Filed: Jun. 1, 2005

(65) Prior Publication Data

US 2006/0276304 A1 Dec. 7, 2006

(51) Int. Cl.
- F02D 41/08 (2006.01)
- B60W 10/18 (2006.01)
- H02J 7/00 (2006.01)

(52) U.S. Cl. ............... 123/339.14; 477/203; 477/183; 320/137

(58) Field of Classification Search ............... 477/107, 477/113, 183–186, 203–206, 904; 123/339.11, 123/339.14, 396, 398; 303/20; 62/132, 62/133, 134, 243; 320/137

See application file for complete search history.

(56) References Cited

U.S. PATENT DOCUMENTS

| | | | |
|---|---|---|---|
| 3,581,852 A * | 6/1971 | Griffen | 477/185 |
| 4,638,779 A | 1/1987 | Kitada | |
| 4,643,146 A | 2/1987 | Spriessler | |
| 4,649,878 A | 3/1987 | Otobe et al. | |
| 4,766,862 A | 8/1988 | Hibino et al. | |
| 4,779,591 A | 10/1988 | Tordenmalm | |
| 4,955,344 A | 9/1990 | Tatsumi et al. | |
| 4,974,567 A * | 12/1990 | Jensen et al. | 123/398 |
| 5,025,770 A | 6/1991 | Richardson | |
| 5,054,446 A | 10/1991 | Ohuchi | |
| 5,215,056 A | 6/1993 | Harada et al. | |
| 5,219,413 A | 6/1993 | Lineberger | |
| 5,349,826 A * | 9/1994 | Kawai et al. | 62/133 |
| 5,402,007 A | 3/1995 | Center et al. | |
| 5,479,908 A | 1/1996 | Grinberg et al. | |
| 5,586,536 A | 12/1996 | Seo et al. | |
| 5,712,786 A | 1/1998 | Ueda | |
| 5,863,277 A * | 1/1999 | Melbourne | 477/203 |

(Continued)

FOREIGN PATENT DOCUMENTS

EP 774546 B1 2/2000

(Continued)

OTHER PUBLICATIONS

VOLVO, VOLVO Construction Equipment Service Manual L90E, Nov. 2002, pp. 38 and 39, Sweden.

*Primary Examiner*—Willis R. Wolfe, Jr.
(74) *Attorney, Agent, or Firm*—Finnegan, Henderson, Farabow, Garrett & Dunner

(57) ABSTRACT

A method for controlling a variable-speed engine of a machine is provided. The machine may include a park-brake. The method may include receiving a signal indicating an engagement status of the park-brake. The method may also include operating the variable-speed engine at a first idle speed. Additionally, the method may include operating the variable-speed engine at a second idle speed, lower than the first idle speed, only if the signal indicates that the park-brake is engaged.

26 Claims, 5 Drawing Sheets

U.S. PATENT DOCUMENTS

| | | |
|---|---|---|
| 5,884,210 A | 3/1999 | Rettig et al. |
| 5,884,211 A | 3/1999 | Pauli et al. |
| 6,274,944 B1 | 8/2001 | Letang |
| 6,378,492 B1 | 4/2002 | Liu |
| 6,411,881 B1 | 6/2002 | Thomas |
| 6,578,548 B2 | 6/2003 | Kohn |
| 6,664,651 B1 | 12/2003 | Kotre et al. |
| 6,682,459 B1 * | 1/2004 | Knight ................. 477/183 |
| 6,694,240 B1 | 2/2004 | Swick et al. |
| 6,836,718 B2 | 12/2004 | Hasfjord et al. |
| 2003/0205930 A1 * | 11/2003 | Smart ................. 303/20 |
| 2004/0206332 A1 | 10/2004 | Mathews et al. |
| 2005/0003930 A1 | 1/2005 | Hopper |
| 2006/0063642 A1 * | 3/2006 | Hawkins ................. 477/107 |

FOREIGN PATENT DOCUMENTS

| | | |
|---|---|---|
| JP | 9-32613 | 2/1997 |
| JP | 2000-8923 | 1/2000 |
| WO | WO 03/078197 A1 | 9/2003 |

* cited by examiner

METHOD FOR CONTROLLING A VARIABLE-SPEED ENGINE

TECHNICAL FIELD

The present disclosure relates to a method of operating a variable-speed engine and, more particularly, to a method of operating a variable-speed engine of a machine.

Machines, such as wheel loaders, off-highway trucks and other heavy construction and mining machines, are used to perform many tasks. Such machines often include a variable-speed engine, such as a diesel engine, a gasoline engine, a gaseous fuel driven engine, or a turbine engine, that provides power to perform the tasks of the machine. Such work machines generally permit the operator to adjust the operating speed of the variable-speed engine between a preset minimum speed, or idle speed, and a preset maximum speed. Typically, the preset idle speed is a fixed speed.

Operating the engine with a single, fixed idle speed may require a compromise. Operating the variable-speed engine at a relatively low idle speed may economize fuel consumption and reduce noise generation. However, operating the variable-speed engine at a relatively high idle speed may improve other aspects of the operation of the machine, such as the responsiveness of the variable-speed engine, the performance of systems driven by the variable-speed engine, such as an electrical generator and/or a cooling system, and the ability of the variable-speed engine to maintain a desirable operating temperature in cold environments. Each different set of operating conditions of the machine may produce a different optimal balance between economizing fuel consumption and reducing noise generation on the one hand, and providing acceptable performance of the machine on the other. As a result, a machine with a single, fixed idle speed is likely to provide compromised performance operating across a range of conditions.

U.S. Pat. No. 6,274,944 ("the '944 patent") discloses a method for operating a variable-speed engine at different idle speeds under different operating conditions. The '944 patent shows a method of operating a vehicle engine including operating the engine at different idle speeds dependant upon an operating condition of an electrical system and a speed of the vehicle. The method includes increasing the idle speed of the engine if the electrical system voltage is low and the vehicle is stationary.

Although the control method of the '944 patent includes operating the variable-speed engine at different idle speeds under different operating conditions, certain disadvantages persist. For example, by implementing the same idle speed whenever the electrical system voltage is not low, the control method may fail to take advantage of certain operating conditions in which reduced idle speed could reduce fuel consumption and noise without unduly compromising other aspects of performance. Additionally, by increasing the idle speed only if the voltage of the electrical system is low, the operating method may compromise performance in other circumstances wherein an increased idle speed may be desirable.

SUMMARY OF THE INVENTION

One disclosed embodiment includes a method for controlling a variable-speed engine of a machine that includes a park-brake. The method may include receiving a signal indicating an engagement status of the park-brake. The method may also include operating the variable-speed engine at a first idle speed. Additionally, the method may include operating the variable-speed engine at a second idle speed, lower than the first idle speed, only if the signal indicates that the park-brake is engaged.

Another embodiment relates to engine controls for a variable-speed engine. The engine controls may include a controller and a service interface. The engine controls may be configured to operate the variable-speed engine at a first preset idle speed under a first predetermined set of conditions. The engine controls may also be configured to operate the variable-speed engine at a second preset idle speed under a second predetermined set of conditions. Additionally, the engine controls may be configured to reset the first preset idle speed to a first new idle speed if a predetermined communication for resetting the first preset idle speed to the first new idle speed is transmitted from the service interface to the controller. Furthermore, the engine controls may be configured to subsequently operate the variable-speed engine at the first new idle speed under the first predetermined set of conditions.

A further embodiment relates to another method for controlling a variable-speed engine of a machine. The method may include receiving inputs related to conditions of operation of the machine. Additionally, the method may include operating the variable-speed engine at a first idle speed in response to a first predetermined set of conditions. Furthermore, the method may include operating the variable-speed engine at a second idle speed, lower than the first idle speed, in response to a second predetermined set of conditions. The method may also include operating the variable-speed engine at a third idle speed, higher than the first idle speed, in response to a third predetermined set of conditions.

DETAILED DESCRIPTION

Figure 1:
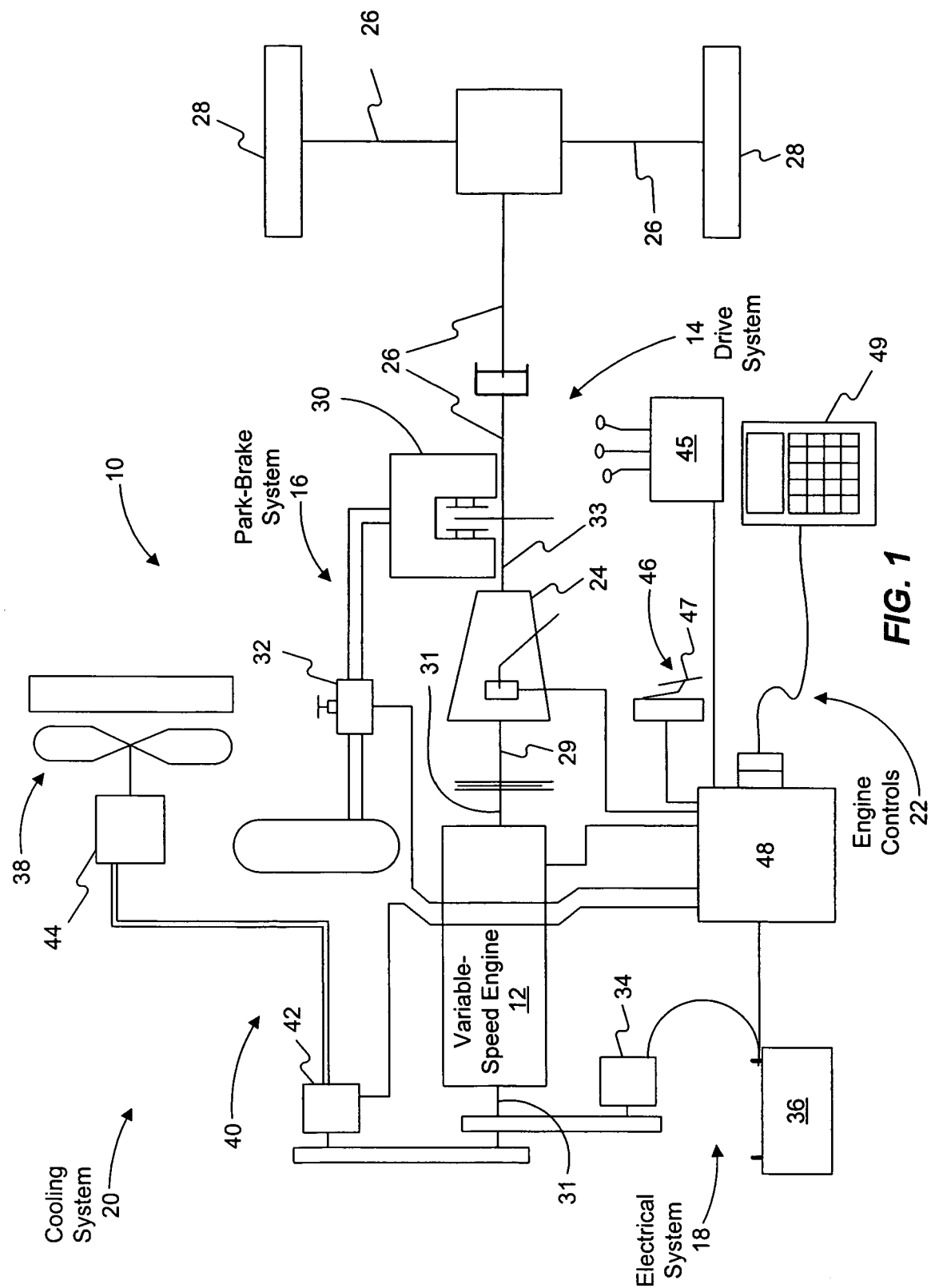
FIG. 1 is a schematic illustration of a work machine according to one disclosed embodiment.

FIG. 1 provides a schematic view of a machine 10. Machine 10 may include a variable-speed engine 12, a drive system 14, a park-brake system 16, an electrical system 18, a cooling system 20, and engine controls 22.

Variable-speed engine 12 may be any type of engine configured to operate at a controllably variable speed to produce power for machine 10. For example, variable-speed engine 12 may be a diesel engine, a gasoline engine, a gaseous fuel driven engine, or a turbine engine. Drive system 14 may be operatively connected to variable-speed engine 12 and configured to receive power from variable-speed engine 12 and transmit that power to the ground to propel machine 10. Drive system 14 may include a transmission 24, drive shafts 26, and traction devices 28. An input shaft 29 of transmission 24 may be connected to an output shaft 31 of variable-speed engine 12. Drive shafts 26 may be connected between an output shaft 33 of transmission 24 and traction devices 28. Drive system 14 may have one or more inactive operating states in which it is not operable to transmit power from variable-speed engine 12 to the ground. For example, drive system 14 may have a transmission-neutral operating state, in which the input shaft 29 of the transmission is decoupled from output shaft 33 of the transmission, causing output shaft 31 of variable-speed engine 12 to be decoupled from output shaft 33 of the transmission, drive shafts 26, and traction devices 28.

Drive system 14 is not limited to the configuration illustrated in FIG. 1. Drive system 14 may include any combination of mechanical, electrical, hydraulic, pneumatic, and/or magnetic power-transmission components configured to receive power from variable-speed engine 12 and transmit that power to the ground to propel machine 10. For example, drive system 14 may include an electric generator operatively connected to variable-speed engine 12 and one or more electric motors electrically connected to the electrical generator and mechanically connected to traction devices 28. Additionally, drive system 14 may include a hydraulic pump operatively connected to variable-speed engine 12 and one or more hydraulic motors operatively connected to the hydraulic pump and mechanically connected to traction devices 28. Furthermore, while FIG. 1 illustrates traction devices 28 as wheels, one or more of traction devices 28 may be track units or other types of devices for transferring power to the ground to propel machine 10.

Park-brake system 16 may include a park-brake 30 and park-brake controls 32. Park-brake 30 may have an engaged operating state in which it is engaged to one or more components of drive system 14 in such a manner to resist motion of machine 10 along the ground. Park-brake 30 may also have a disengaged operating state wherein it does not resist motion of machine 10 along the ground. Park-brake controls 32 may be operatively connected to park brake 30 and configured to control whether park brake 30 is engaged or disengaged. Park-brake 30 may be configured to hold machine 10 in a stopped position, rather than to slow machine 10 to a stop. A separate service-brake system may be provided to slow machine 10 to a stop.

Electrical system 18 may include a generator 34 and a battery 36. Generator 34 may be operatively connected to variable-speed engine 12. Generator 34 may be configured to receive power from variable-speed engine 12 and convert at least a portion of that power into electrical energy. Battery 36 may be electrically connected to generator 34 in such a manner to receive electrical energy from generator 34 and store that electrical energy.

Cooling system 20 may be configured to cool variable-speed engine 12 and/or other systems of machine 10. Cooling system 20 may include a fan 38 and a fan-drive system 40. Fan-drive system 40 may be configured to draw power from variable-speed engine 12 to drive fan 38 and provide cooling. For example, fan-drive system 40 may include a hydraulic pump 42 configured to draw power from variable-speed engine 12 and to provide a flow of pressurized hydraulic fluid. Hydraulic pump 42 may be an electrically-controlled hydraulic pump that may be configured to pump hydraulic fluid at a rate dependant upon a magnitude of a control current provided to hydraulic pump 42 by controls (not shown) of fan-drive system 40. Fan-drive system 40 may also include a hydraulic motor 44 configured to receive a flow of pressurized hydraulic fluid from hydraulic pump 42 and to drive fan 38 with energy from the flow of pressurized hydraulic fluid.

Cooling system 20 is not limited to the configuration described above in connection with FIG. 1. Fan-drive system 40 may include other types of components for drawing power from variable-speed engine 12 to power fan 38. For example, fan-drive system 40 may include a thermostatically-controlled viscous or clutch-type coupling for selectively connecting and/or controlling a slip rate between fan 38 and output shaft 31 of variable-speed engine 12.

Engine controls 22 may be operatively connected to variable-speed engine 12 and configured to control the operating speed of variable-speed engine 12. Engine controls 22 may include operator controls, a controller 48, and a service interface 49.

Operator controls may include one or more of drive-system controls (not shown), implement controls 45, throttle controls 46, and controls for operating various other systems of machine 10. Controller 48 may be communicatively linked to the drive-system controls. The drive system controls may enable an operator to request propulsion of machine 10. Additionally, controller 48 may be communicatively linked to implement controls 45. Implement controls 45 may enable an operator to request operation of implements (not shown) of machine 10, such as excavators and lifts. Throttle controls 46 may be configured to transmit operator inputs related to a desired power output or operating speed of variable-speed engine 12 to other components of engine controls 22. Throttle controls 46 may be configured to transmit an idle-speed request to other components of engine controls 22 in response to certain inputs, or lack thereof, from an operator.

Controller 48 may include one or more processors (not shown) and memory devices (not shown). Controller 48 may be operatively connected to one or more systems of variable-speed engine 12 that affect the operating speed of variable-speed engine 12, such as a fuel-metering system (not shown) and/or an air-metering system (not shown). Controller 48 may be configured to control such systems in order to control the operating speed of variable-speed engine 12. Controller 48 may be dedicated to controlling one or more aspects of operation of variable-speed engine 12. Alternatively, controller 48 may be configured to also monitor and/or control other systems of machine 10.

As is shown in FIG. 1, service interface 49 may be an off-board service tool that is not permanently mounted to machine 10, but configured to be readily communicatively linked to controller 48 to allow a technician to transmit communications to and receive communications from controller 48. Such a service tool may include one or more processors (not shown) and or memory devices (not shown). Service interface 49 may be configured with provisions for enabling a technician to reconfigure the control logic according to which engine controls 22 operate. As is described in greater detail below, engine controls 22 may include provisions for a technician to disable one or more modes of operation of engine controls 22 and/or provisions for a technician to reset one or more preset speeds for operating variable-speed engine 12. Service interface 49 may include part or all of such provisions. Service interface 49 is not limited to the configuration shown in FIG. 1. For example, in addition to, or in place of, an off-board service tool, service interface 49 may include one or more components mounted to machine 10 and communicatively linked to controller 48, such as operator controls (not shown) of machine 10. In some embodiments, service interface 49 may include components of controller 48.

Engine controls 22 may be configured to receive inputs relating to conditions of operation of machine 10 and control the operating speed and/or power output of variable-speed engine 12 dependant upon those inputs. For example, engine controls 22 may be configured to control the operating speed and/or power output of variable-speed engine 12 based upon operator inputs received through drive-system controls, implement controls 45, throttle controls 46, and/or controls for other systems of machine 10. In some such embodiments, controller 48 may control the operating speed of variable-speed engine 12 to provide the power output and/or engine speed necessary to fulfill the operator's request for propulsion, implement movement, or operation of other systems of machine 10. Similarly, controller 48 may control the operating speed of variable-speed engine 12 dependant upon operator inputs received through throttle controls 46. In any of these embodiments, an idle speed is established, which is the minimum engine speed allowable, regardless of how the engine speed is adjusted.

Engine controls 22 may also be configured to control the operating speed of variable-speed engine 12 dependant upon conditions of operation of machine 10 other than operator inputs. Controller 48 may be configured to receive signals from one or more sensors (not shown) and/or other controls (not shown) of machine 10 and to control the operating speed of variable-speed engine 12 dependant upon those signals. Engine controls 22 may be configured to receive inputs relating to whether drive system 14 has an active or inactive operating state and to control the operating speed of variable-speed engine 12 dependant upon those inputs. For example, controller 48 may be configured to receive control signals or sensor signals relating to whether transmission 24 is in its neutral operating state and to control the operating speed of variable-speed engine 12 dependant upon whether transmission 24 is in its neutral operating state.

Engine controls 22 may be configured to receive inputs relating to whether park-brake 30 is engaged or disengaged and control the operating speed of variable-speed engine 12 dependant upon those inputs. Controller 48 may be communicatively linked to park-brake controls 32 and configured to receive control signals from park-brake controls 32 that indicate whether park-brake 30 is engaged or disengaged. Additionally, controller 48 may be configured to receive sensor signals relating to whether park-brake 30 is engaged or disengaged. For example, controller 48 may be configured to receive sensor signals relating to operating conditions such as a position of one or more components of park-brake 30 and/or a pressure of an actuating fluid of park-brake 30.

Engine controls 22 may be configured to receive inputs relating to an operating condition of electrical system 18 and to control the operating speed of variable-speed engine 12 dependant upon those inputs. Controller 48 may be configured to receive controller signals from other controllers of electric system 18 and/or sensor signals relating to the charge level of battery 36. For example, controller 48 may be configured to receive controller signals and/or sensor signals relating to a voltage level of battery 36. Additionally, controller 48 may be configured to receive signals relating to a net charging or discharging rate of the battery.

Engine controls 22 may be configured to receive inputs relating to the amount of power fan-drive system 40 is drawing from variable-speed engine 12 and to control the operating speed of variable-speed engine 12 dependant upon those inputs. Controller 48 may be configured to receive controller signals and/or sensor signals relating to the amount of power fan-drive system 40 draws from variable-speed engine 12. In embodiments wherein hydraulic pump 42 is configured to pump hydraulic fluid at a rate dependant upon the magnitude of a control current delivered to hydraulic pump 42, controller 48 may be configured to receive an input relating to the magnitude of the control current delivered to hydraulic pump 42. Additionally, controller 48 may be configured to receive controller and/or sensor signals relating to a speed and/or pitch at which fan 38 is operated.

Engine controls 22 may be configured to receive inputs relating to conditions of operation of variable-speed engine 12 and to control the operating speed of variable-speed engine 12 dependant upon those inputs. Controller 48 may be configured to receive inputs relating to one or more operating temperatures of variable-speed engine 12 and to control the operating speed of variable-speed engine 12 dependant upon those operating temperatures. For example, controller 48 may be configured to receive controller and/or sensor signals relating to a temperature of coolant of variable-speed engine 12 and/or a temperature of intake air of variable-speed engine 12 and control the operating speed of variable-speed engine 12 dependant upon those signals.

Control logic of engine controls 22 may include a plurality of idle modes in which engine controls 22 may operate. For example, the control logic of engine controls 22 may include a working idle mode, a hibernation idle mode, a low-battery idle mode, and/or a warm-up idle mode. As is described in greater detail below in connection with FIGS. 2A and 2B, engine controls 22 may be configured to operate in each of the idle modes according to the operating conditions of machine 10.

Each idle mode of the control logic may include a separate algorithm for controlling the idle speed of variable-speed engine 12. In some embodiments, the control algorithms of one or more of the idle modes may include operating the variable-speed engine at a preset idle speed specific to the idle mode. For example, the control algorithm of the working idle mode may include operating variable-speed engine 12 at a preset working idle speed. Similarly, the control algorithm of the hibernation idle mode may include operating variable-speed engine 12 at a preset hibernation idle speed. Likewise, the control algorithm of the low-battery idle mode may include operating variable-speed engine 12 at a preset low-battery idle speed. And the control algorithm of the warm-up idle mode may include operating variable-speed engine 12 at a preset low warm-up idle speed. In such embodiments, the preset hibernation idle speed may be lower than the other preset idle speeds. Additionally, the preset low-battery idle speed and the preset warm-up idle speed may be higher than the preset working idle speed and the preset hibernation idle speed. For example, the control logic of engine controls 22 may include a preset working idle speed of 825 RPM, a preset hibernation idle speed of 600 RPM, a preset low-battery idle speed of 1100 RPM, and a preset warm-up idle speed of 1100 RPM.

The portions of the control logic of engine controls 22 relating to idle modes are not limited to the configurations described above. The control logic of engine controls 22 may include more or less idle modes. Additionally, one or more of the idle speeds associated with a particular idle mode may be defined in terms of conditions of operation of machine 10, as opposed to being defined as a specific numerical value. For example, the hibernation idle speed may be defined as a function of the duration of operation in hibernation idle mode.

Engine controls 22 may be configured with provisions for a technician to alter the manner in which engine controls 22 control the operating speed of variable-speed engine 12. Engine controls 22 may include provisions for a technician to disable one or more of the idle modes of the control logic of engine controls 22. For example, controller 48 and/or service interface 49 may be configured with provisions for a technician to disable the warm-up idle mode by transmitting a predetermined communication to controller 48.

Engine controls 22 may also include provisions for a technician to reset preset idle speeds of one or more of the idle modes. For example, controller 48 and/or service interface 49 may be configured with provisions for allowing a technician to reset the preset working idle speed of the engine to a new idle speed by transmitting a predetermined set of communications to controller 48. Engine controls 22 may further include provisions for resetting any other preset idle speeds, such as the hibernation idle speed, warm-up idle speed, and/or low-battery idle speed.

Additionally, engine controls 22 may be configured with a predetermined set of speeds to which a technician can reset a particular preset idle speed of engine controls 22. For example, controller 48 and/or service interface 49 may be programmed such that a working idle speed is resettable to any speed within a range from 650–1000 RPM and such that a hibernation idle speed is resettable to any speed within a range from 600–825 RPM. For any preset idle speed, engine controls 22 may include a unique predetermined set of speeds to which that preset idle speed may be reset. Alternatively, engine controls 22 may be configured to allow a technician to reset a preset idle speed to any desired speed.

Engine controls 22 are not limited to the configurations discussed above in connection with FIG. 1. Engine controls 22 may be configured in any manner including some or all of the provisions described herein above and suitable for executing the methods described herein below for controlling the operating speed of variable-speed engine 12. For example, engine controls 22 may implement hardwired logic circuitry, mechanical control components, pneumatic control components, hydraulic control components, and/or optical control components in addition to, or in place of, controller 48. Engine controls 22 may also include other controllers in addition to controller 48, and the control logic of engine controls 22 may be distributed between controller 48 and any such other controllers.

The disclosed embodiments have potential application in any type of machine 10 including a variable-speed engine 12 for providing power to systems of machine 10. The operation of a machine 10 with a variable-speed engine 12 and engine controls 22 according to the disclosed embodiments are described below.

Variable-speed engine 12 may produce power and transmit that power to other components of machine 10. Drive system 14 may, when in an active operating state, draw power from output shaft 31 of variable-speed engine 12 and transmit that power to the ground to propel machine 10. When in an inactive operating state, drive system 14 may allow engine controls 22 to operate variable-speed engine 12 at any speed without affecting whether, or at what speed, machine 10 travels along the ground.

Generator 34 may also draw power from output shaft 31 of variable-speed engine 12 to generate electricity and charge battery 36. In certain embodiments, generator 34 may operate at a speed that is proportional to the operating speed of variable-speed engine 12. In such embodiments, generator 34 may generate electricity and charge battery 36 at a higher rate for each higher operating speed of variable-speed engine 12.

Cooling system 20 may operate fan 38 to cool components of machine 10. To operate fan 38, fan-drive system 40 may draw power from variable-speed engine 12 and transmit at least a portion of that power to fan 38. For example, hydraulic pump 42 may draw power from variable-speed engine 12 and provide a flow of pressurized hydraulic fluid to hydraulic motor 44, which drives fan 38. Controls (not shown) of fan-drive system 40 may control the amount of power fan-drive system 40 draws from variable-speed engine 12 in a manner dependant upon cooling requirements of machine 10. In certain embodiments, the controls of fan-drive system 40 may control the amount of power hydraulic pump 42 draws from variable-speed engine 12 by adjusting a control current delivered to hydraulic pump 42.

Park-brake system 16 may selectively allow or resist motion of machine 10 along the ground. When park-brake 30 is engaged, park-brake 30 resists motion of one or more components of drive system 14 to which it is engaged. When park-brake 30 is disengaged, park-brake 30 does not resist motion of machine 10 along the ground. Park-brake controls 32 may selectively engage and disengage park-brake 30, such as by transmitting force applied by an operator through a linkage or by activating one or more electrical, hydraulic, pneumatic, or other types of actuators.

Engine controls 22 may control the operating speed of variable-speed engine 12, such as by controlling a fuel metering system (not shown) and/or an air metering system (not shown) to control the rate at which fuel and/or air are consumed by variable-speed engine 12. Engine controls 22 may control the operating speed of variable-speed engine 12 dependant upon inputs relating to operating conditions of machine 10. As is described in greater detail below in connection with FIGS. 2A and 2B, engine controls 22 may operate in one of a plurality of idle modes, under predetermined operating conditions of machine 10. For example, engine controls 22 may operate in one of a working idle mode, a hibernation idle mode, a low-battery idle mode, and a warm-up idle mode.

When operating in a particular idle mode, engine controls 22 may control the operating speed of variable-speed engine 12 according to an algorithm specific to that idle mode. When operating in hibernation idle mode, engine controls 22 may operate variable-speed engine 12 at a speed lower than when operating in working idle mode. For example, engine controls 22 may operate variable-speed engine 12 at a preset hibernation idle speed, such as 600 RPM, when in hibernation idle mode, and at a preset working idle speed, such as 825 RPM, when in working idle mode. When operating in low-battery idle mode, engine controls 22 may operate variable-speed engine 12 at a speed higher than when in working idle mode. For example, engine controls 22 may operate variable-speed engine 12 at a preset low-battery idle speed, such as 1100 RPM, when in low-battery idle mode.

Additionally, in embodiments including one or more preset idle speeds, engine controls 22 may also allow a technician to reset one or more of the preset idle speeds. For example, engine controls 22 may allow a technician to reset a preset hibernation idle speed to a new idle speed. To do so, a technician may transmit a predetermined communication to controller 48 for resetting the preset idle speed to the new idle speed. The technician may manipulate service interface 49 in a predetermined manner for communicating a command to reset the hibernation idle speed to the new idle speed. In response to the technician manipulating service interface 49 in such a predetermined manner, service interface 49 may transmit predetermined communications to controller 48, causing controller 48 to reset hibernation idle speed to the new idle speed. For each speed that engine controls 22 allow a technician to reset the preset hibernation idle speed to, there may be a unique predetermined set of manipulations of service interface 49 and a corresponding unique predetermined set of communications that service interface 49 will transmit to controller 48. For example, if engine controls 22 are configured to allow a technician to reset the preset hibernation idle speed to 650 RPM, 700 RPM, or 750 RPM, there may be a unique predetermined set of manipulations of service interface 49 and corresponding communications from service interface 49 to controller 48, for each of these possible new hibernation idle speeds. Following resetting of the hibernation idle speed, engine controls 22 will operate variable-speed engine 12 at the new idle speed whenever the control logic of engine controls 22 calls for operating variable-speed engine 12 at hibernation idle speed. Engine controls 22 may allow a technician to reset one or more other preset idle speeds, such as the working idle speed, the low-battery idle speed, and/or the warm-up idle speed, in similar manners.

Different embodiments of engine controls 22 may give a technician different options in resetting one or more preset idle speeds of engine controls 22. In certain embodiments, engine controls 22 may allow a technician to reset a particular idle speed only to one of a predetermined set of speeds. For example, engine controls 22 may allow a technician to reset the working idle speed only between 650 RPM and 1000 RPM and to reset the hibernation idle speed only between 600 RPM and 825 RPM. Additionally, in some embodiments, engine controls 22 may allow a technician to reset a preset idle speed only to one of a finite set of specific speeds. Alternatively, in some embodiments, engine controls 22 may allow a technician to reset a preset idle speed to any speed a technician desires.

Figure 2A:
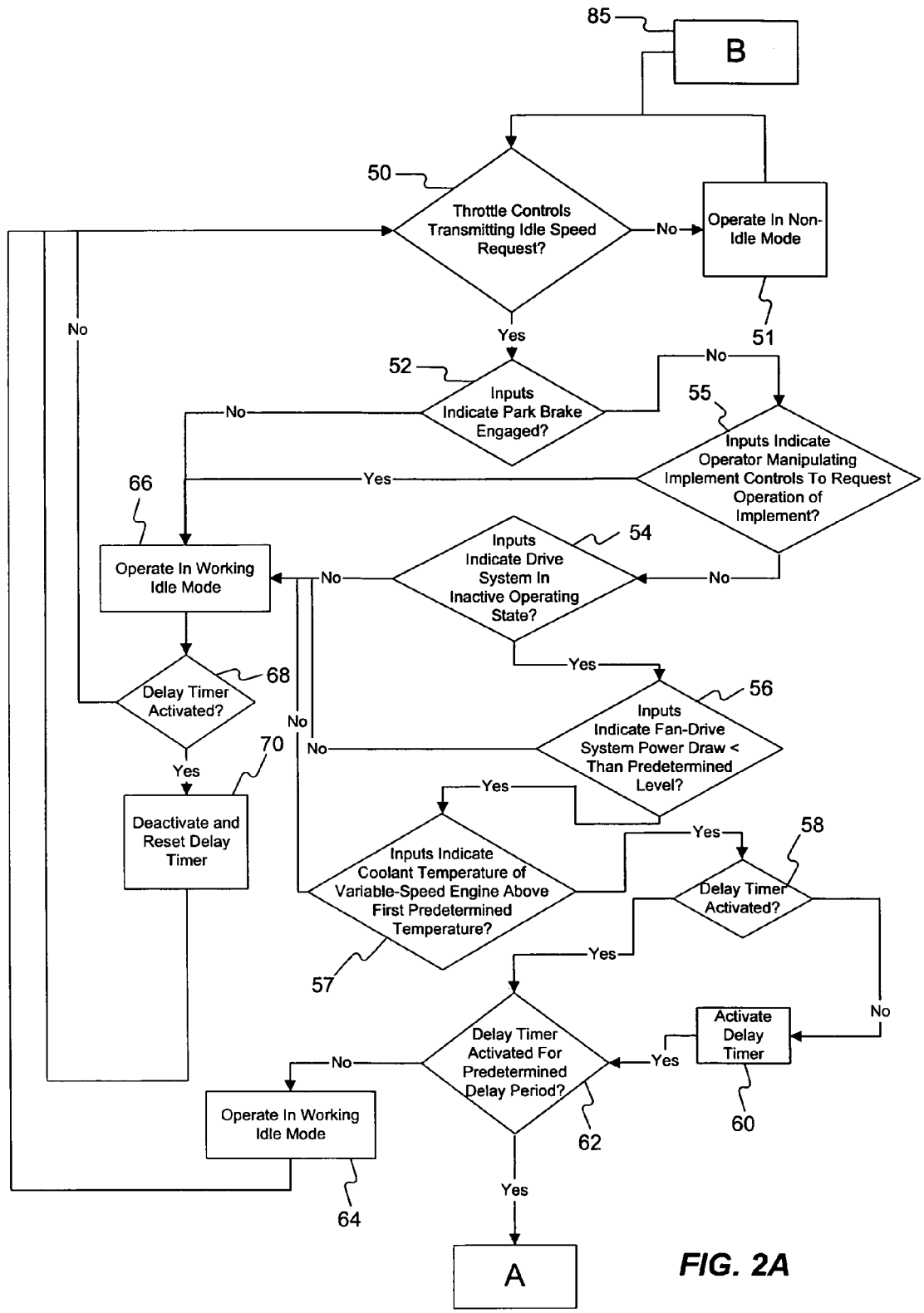
FIG. 2A is a first portion of a flow chart illustrating a method for operating a variable-speed engine according to one embodiment of the present disclosure.
Figure 2B:
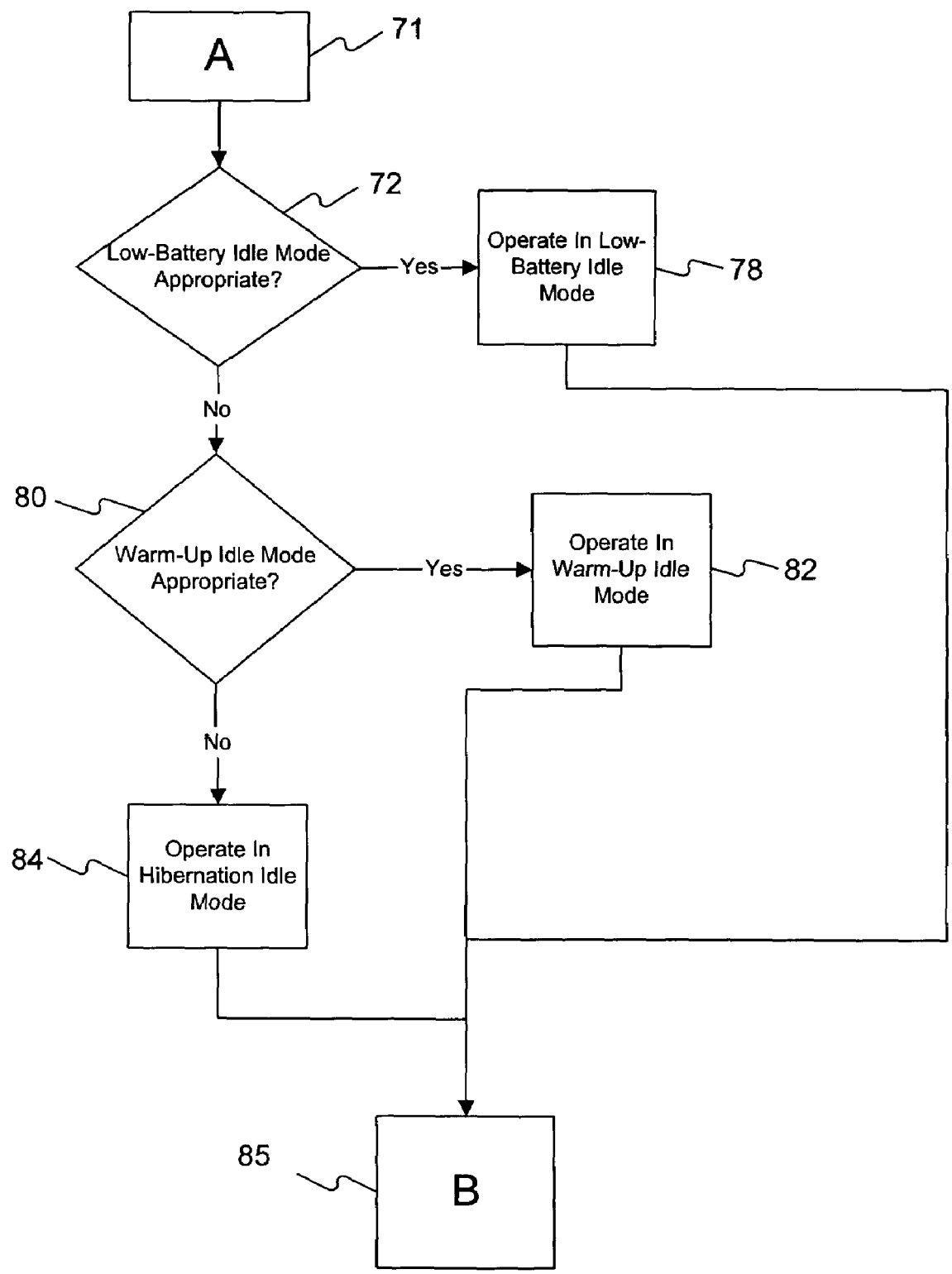
FIG. 2B is a second portion of the flow chart of FIG. 2A.

FIGS. 2A and 2B illustrate one embodiment of a method according to which engine controls 22 may determine whether to operate in an idle mode and, if so, what idle mode to operate in. At step 50, controller 48 may determine whether throttle controls 46 are transmitting an idle-speed request. For example, in certain embodiments, controller 48 may determine whether inputs from throttle controls 46 indicate that throttle member 47 is in a predetermined idle position. If throttle controls 46 are not transmitting an idle-speed request, controller 48 may cause engine controls 22 to operate in a non-idle mode (step 51).

If throttle controls 46 are transmitting an idle-speed request, controller 48 may proceed to make a series of determinations affecting which of a plurality of idle modes is appropriate. Controller 48 may first determine whether work machine 10 is in a generally active state, in which case working idle mode may be appropriate, or a generally inactive state, in which case hibernation idle mode, low-battery idle mode, or warm-up idle mode may be appropriate.

In order to determine whether machine 10 is in a generally inactive state, controller 48 may receive controller and/or sensor signals relating to the operating state of park-brake 30 and determine if these inputs indicate that park-brake 30 is engaged (step 52). Controller 48 may receive controller signals from park-brake controls 32. Additionally, controller 48 may receive sensor signals relating to operating conditions of park-brake 30, such as a position of one or more components of park-brake 30 and/or a pressure of an actuating fluid of park-brake 30. If inputs to controller 48 indicate that park-brake 30 is engaged, controller 48 may receive controller and/or sensor signals relating to the operating state of drive system 14 and determine whether these inputs indicate that drive system 14 is in an inactive operating state (step 54). For example, controller 48 may receive inputs indicating whether drive system 14 is in a transmission-neutral operating state. If inputs to controller 48 indicate that drive system 14 is in an inactive operating state, controller 48 may determine whether inputs to controller 48 indicate that an operator is manipulating implement controls 45 to request operation of an implement (step 55).

If inputs to controller 48 indicate that an operator is not manipulating implement controls 45 to request operation of an implement, controller 48 may determine whether it is receiving inputs indicating that the quantity of power fan-drive system 40 is drawing from variable-speed engine 12 is less than a predetermined amount (step 56). To do so, controller 48 may receive controller signals and/or sensor signals relating to operating conditions of fan-drive system 40. For example, in embodiments wherein hydraulic pump 42 draws power at a rate dependant upon a control current, controller 42 may monitor the magnitude of the control current. Additionally, controller 48 may receive and respond to sensor signals relating to operating conditions of fan-drive system 40, such as sensor signals relating to the speed and/or pitch of fan 38. If inputs to controller 48 indicate that fan-drive system 40 is not drawing more than a predetermined amount of power from variable-speed engine 12, controller 48 may determine if the coolant temperature of variable-speed engine 12 is above a first predetermined temperature (step 57), such as 75 degrees Celsius. If the coolant temperature of variable-speed engine 12 is above the first predetermined temperature, this may indicate that variable-speed engine 12 may be able to operate smoothly at lower idle speeds, such as hibernation idle speed.

An affirmative determination at steps 50, 52, 54, 56, and 57, combined with a negative determination at step 55, may indicate that machine 10 is in a generally inactive state, and that operating in hibernation idle mode, low-battery idle mode, or warm-up idle mode, may be more appropriate than operating in a working idle mode. However, in order to avoid excessive cycling of engine controls 22 between working idle mode and other idle modes, engine controls 22 may wait for a predetermined delay period before operating in hibernation idle mode, low-battery idle mode, or warm-up idle mode. Accordingly, at steps 58 and 60, controller 48 may determine if a delay timer is running and, if not, activate the delay timer. Once the delay timer is running, controller 48 may determine if the delay timer has been activated for the duration of the predetermined delay period (step 62).

If the delay timer has not been activated for the predetermined delay period, controller 48 may cause engine controls 22 to operate in working idle mode (step 64). Additionally, if controller 48 makes a negative determination at any one of steps 50, 52, 54, 56, or 57, or an affirmative determination at step 55, it may indicate that machine 10 is in a generally active state, and controller 48 may also cause engine controls 22 to operate in working idle mode (step 66). When engine controls 22 operate in working idle mode, they may operate variable-speed engine 12 at a speed higher than if they were operating in hibernation idle mode. For example, when in working idle mode, engine controls 22 may operate variable-speed engine 12 at a preset working idle speed, such as 825 RPM. Operating variable-speed engine 12 at a speed higher than when in hibernation idle mode may improve the responsiveness of variable-speed engine 12. Following step 66, controller 48 may determine if the delay timer is running (step 68) and, if so, deactivate and reset the delay timer (step 70).

If, however, controller 48 determines at step 62 that the delay timer has been activated for the predetermined delay period, controller 48 may proceed to step 71 and from there to the series of steps illustrated in FIG. 2B. At step 72, controller 48 may determine whether operating in low-battery idle mode is appropriate. Generally, low-battery idle mode is appropriate if inputs to engine controls 22 indicate that battery 36 has a low charge level and/or is discharging at an undesirably high rate. One embodiment of an algorithm that engine controls 22 may execute in determining whether low battery idle mode is appropriate is described in detail below in connection with FIG. 3. If controller 48 determines that low-battery idle mode is appropriate, controller 48 may cause engine controls 22 to operate in low-battery idle mode (step 78). When in low-battery idle mode, engine controls 22 may operate variable-speed engine 12 at a higher speed than when operating in hibernation idle mode. For example, when in low-battery idle mode, engine controls 22 may operate variable-speed engine 12 at a preset low-battery idle speed, such as 1100 RPM. Operating variable-speed engine 12 at a speed higher when in low-battery idle mode than when in hibernation idle mode may cause generator 34 to provide electricity to battery 36 at a greater rate.

If controller 48 determines that low-battery idle mode is not appropriate, controller 48 may determine whether warm-up idle mode is appropriate (step 80). Generally, warm-up idle mode will be appropriate when inputs to engine controls 22 indicate that one or more operating temperatures of variable-speed engine 12 and/or variable-speed engine 12 are below one or more predetermined temperatures. One embodiment of an algorithm that engine controls 22 may execute in determining whether warm-up idle mode is appropriate is described in detail below in connection with FIG. 4. If controller 48 determines that warm-up idle mode is appropriate, controller 48 may cause engine controls 22 to operate in warm-up idle mode (step 82). When in warm-up idle mode, engine controls 22 may operate variable-speed engine 12 at a higher speed than if engine controls 22 were in hibernation idle mode. For example, engine controls 22 may operate variable-speed engine 12 at a preset warm-up idle speed, such as 1100 RPM. By operating variable-speed engine 12 at a higher speed when in warm-up idle mode than when in hibernation idle mode, engine controls 22 may cause variable-speed engine 12 to produce heat at a greater rate.

If controller 48 determines at steps 72 and 80 that neither low-battery idle mode nor warm-up idle mode is appropriate, controller 48 may cause engine controls 22 to operate in hibernation idle mode (step 84). When operating in hibernation idle mode, engine controls 22 may operate variable-speed engine 12 at a lower speed than when operating in working idle mode, low-battery idle mode, or warm-up idle mode. For example, engine controls 22 may operate variable-speed engine 12 at a preset hibernation idle speed, such as 600 RPM. By operating variable-speed engine 12 at a lower speed when in hibernation idle mode than when in working idle mode, low-battery idle mode, or warm-up idle mode, engine controls 22 may reduce the fuel consumption and noise generation of variable-speed engine 12. Operating variable-speed engine 12 at a lower idle speed only when machine 10 is in a generally inactive state may provide this reduced fuel consumption and noise generation without compromising other aspects of the performance of work machine 10.

After determining that operation in a particular idle mode is appropriate, controller 48 may return to step 50 of FIG. 2A and iterate the above-described series of steps. For example, controller 48 may return to step 50 from steps 51, 64, 66, 68, or 70 of FIG. 2A. Similarly, from steps 78, 82, or 84 of FIG. 2B, controller 48 may proceed to step 85 and, from there, to step 50 of FIG. 2A.

Methods according to which engine controls 22 operate variable-speed engine 12 are not limited to the embodiments described above in connection with FIGS. 2A and 2B. For example, logic systems other than controller 48, such as logic systems composed of hardwired logic circuitry, mechanical logic devices, hydraulic logic devices, pneumatic logic devices, and/or optical logic devices may execute some or all of the methods described in connection with FIGS. 2A and 2B. Similarly, other controllers may work in concert with controller 48 in executing methods according to FIGS. 2A and 2B. Additionally, engine controls 22 may execute the steps illustrated in FIGS. 2A and 2B in different orders. Furthermore, a method of controlling variable-speed engine 12 may omit some of the steps shown in FIGS. 2A and 2B and/or include steps not shown in FIGS. 2A and 2B. A method of controlling variable-speed engine 12 may include different sets of conditions for operating in the various idle modes. For example, consistent with certain embodiments, engine controls 22 may operate in hibernation idle mode independent of the power requirements of fan-drive system 42, whether drive system 14 is in an inactive operating state, and/or whether an operator is manipulating implement controls 45 to request operation of an implement. Additionally, in some embodiments, under some circumstances, engine controls 22 may automatically operate in an idle mode without receiving an idle-speed request from throttle controls 46. Furthermore, the control logic of engine controls 22 may omit the delay timer described above in connection with FIGS. 2A and 2B. Moreover, methods of operating variable-speed engine 12 may include additional idle modes and additional conditions associated with operating in such additional idle modes.

Similarly, methods of operating variable-speed engine 12 may omit one or more of the idle modes described in connection with FIGS. 2A and 2B. For example, in some embodiments, the control logic of engine controls 22 may omit low-battery idle mode and/or warm-up idle mode. In such embodiments, engine controls 22 may operate in working idle mode in some or all of the circumstances that would trigger operation in low-battery idle mode and/or hibernation idle mode in the embodiments of FIGS. 2A and 2B. Likewise, hibernation idle mode may replace low-battery idle mode and/or warm-up idle mode in some or all of the circumstances that trigger low-battery idle mode and/or warm-up idle mode in the embodiments of FIGS. 2A and 2B.

Figure 3:
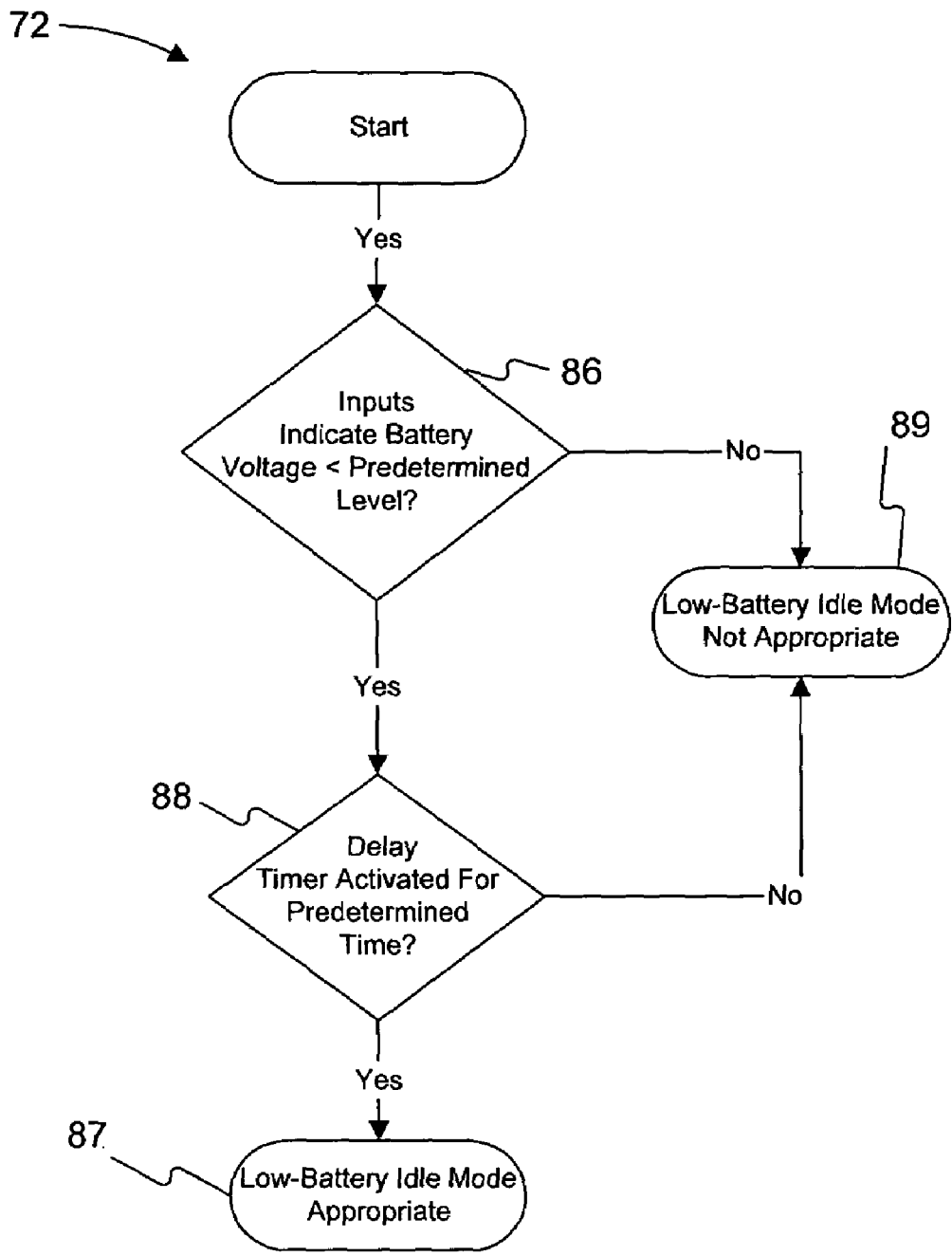
FIG. 3 is a flow chart illustrating a method of executing one of the steps shown in FIG. 2B according to one disclosed embodiment.

FIG. 3 illustrates one embodiment of an algorithm that engine controls 22 may execute to determine, at step 72 of the methods illustrated in FIGS. 2A and 2B, whether low-battery idle mode is appropriate. Controller 48 may receive controller and/or sensor signals relating to operating conditions of electrical system 18 and determine whether those inputs indicate that the voltage of battery 36 is below a predetermined level, such as 24.5 volts (step 86). If so, controller 48 may determine whether the delay timer, which was activated at step 60 in FIG. 2A, has been activated for a predetermined period of time, such as 5 minutes (step 88). If the inputs indicate that the voltage level of battery 36 is below the predetermined level and the delay timer has been activated for the predetermined period of time, controller 48 may determine that low-battery idle mode is appropriate (step 87). If low-battery idle mode is appropriate, controller 48 may proceed from step 87 to step 78 of FIG. 2B and operate in low-battery idle mode.

However, if inputs indicate that the voltage level of battery 36 is above the first predetermined level, battery 36 may have an acceptable state of charge, and low-battery idle mode may not be appropriate (step 89). Additionally, prior to expiration of the predetermined delay period of step 88, recent events, such as starting variable-speed engine 12 with electricity from battery 36, may have caused a large, but temporary, drop in the voltage level of battery 36. Accordingly, if controller 48 determines at step 88 that the delay timer has not been active for the predetermined delay period, a low voltage level may not indicate a low charge level and low-battery idle mode may not be appropriate. If low-battery idle mode is not appropriate, controller 48 may proceed from step 89 to step 80 of FIG. 2B.

Methods of determining whether low-battery idle mode is appropriate are not limited to the embodiments described above in connection with FIG. 3. For example, the predetermined voltage level of battery 36 may be defined as a function of other inputs to engine controls 22, rather than a specific, numerical voltage. Additionally, engine controls 22 may factor other conditions of operation, such as inputs relating to a rate at which battery 36 is being charged or discharged, into the determination of whether low-battery idle mode is appropriate. Furthermore, engine controls 22 may reference one or more other delay timers, triggered by different events, when determining whether low-battery idle mode is appropriate. Alternatively, engine controls 22 may make the determination without reference to any delay timers.

Figure 4:
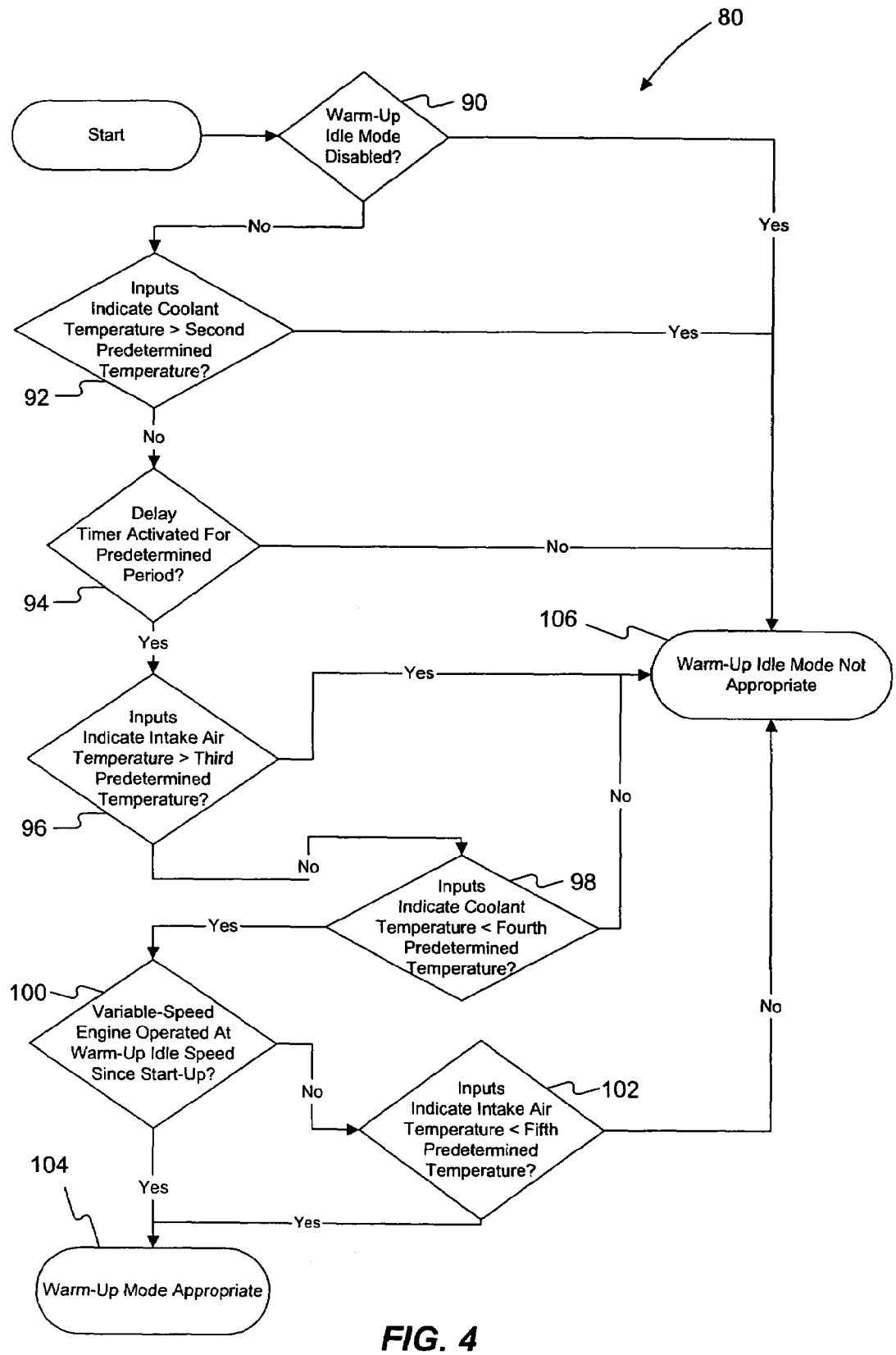
FIG. 4 is a flow chart illustrating a method of executing another of the steps shown in FIG. 2B according to one disclosed embodiment.

FIG. 4 illustrates one embodiment of a method that engine controls 22 may implement to determine, at step 80 of the methods illustrated in FIGS. 2A and 2B, whether warm-up idle mode is appropriate. In determining whether warm-up idle mode is appropriate, controller 48 may first determine whether warm-up idle mode has been disabled (step 90). If warm-up idle mode has not been disabled, controller 48 may receive controller and/or sensor signals relating to a temperature of coolant of variable-speed engine 12 and determine if these inputs indicate that the coolant temperature of variable-speed engine 12 is above a second predetermined temperature, such as 80 degrees Celsiu(step 92). If not, controller 48 may determine whether the delay timer, which was activated at step 60 in FIG. 2A, has been activated for a predetermined period of time, such as 10 minutes (step 94). If so, controller 48 may receive controller and/or sensor signals relating to a temperature of intake air of variable-speed engine 12 and determine whether these inputs indicate that the temperature of intake air of variable-speed engine 12 is above a third predetermined temperature, such as 15 degrees Celsius (step 96). If inputs indicate that the temperature of the intake air is not above the third predetermined temperature, controller 48 may determine whether inputs indicate that the coolant temperature of variable-speed engine 12 is below a fourth predetermined temperature, such as 70 degrees Celsius (step 98). If so, controller 48 may determine whether engine controls 22 have been in warm-up idle mode since start-up of variable-speed engine 12 (step 100).

If engine controls 22 have not been in warm-up idle mode since start-up, controller 48 may determine whether inputs indicate that the temperature of intake air of variable-speed engine 12 is below a fifth predetermined temperature, such as 5 degrees Celsius (step 102). If so, warm-up idle mode may be appropriate (step 104). Similarly, if controller 48 determines at step 100 that engine controls 22 have been in warm-up idle mode since start-up, warm-up idle mode may be appropriate regardless of whether the temperature of the intake air is below the fifth predetermined temperature. If warm-up idle mode is appropriate, controller 48 may proceed from step 104 to step 82 of FIG. 2B and operate in warm-up idle mode.

However, if controller 48 determines at step 100 that engine controls 22 have not been in warm-up idle mode since start-up and that inputs indicate that the temperature of the intake air is not below the fifth predetermined level, warm-up idle mode may not be appropriate (step 106). Similarly, if warm-up idle mode has been disabled (step 90), inputs indicate that the coolant temperature is above the second predetermined temperature (step 92), or the delay timer has not been activated for the predetermined delay period at step 94, warm-up idle mode may not be appropriate. Likewise, if inputs indicate that the temperature of the intake air is not below the third predetermined temperature (step 96) or that the temperature of the coolant is not below the fourth predetermined temperature (step 98), warm-up idle mode may not be appropriate. If warm-up idle mode is not appropriate, controller 48 may proceed from step 16 to step 84 of FIG. 2B and operate in hibernation idle mode.

Methods of determining whether warm-up idle mode is appropriate are not limited to the embodiments described above in connection with FIG. 4. For example, in determining whether warm-up idle mode is appropriate, engine controls 22 may omit one or more of the factors described above, such as the status of the delay timer, the coolant temperature of variable-speed engine 12, and/or the temperature of intake air of variable-speed engine 12. Furthermore, the first predetermined temperature, referenced at step 57, the second predetermined temperature, referenced at step 92, and the fourth predetermined temperature, referenced at step 98, may have different values in different applications. Additionally, the predetermined temperatures referenced in making the determination may be defined as a function of other inputs to engine controls 22, rather than a specific, numerical temperature. Furthermore, engine controls 22 may base the determination, in whole or in part, upon other factors, such as inputs relating to other temperatures of machine 10 and/or the temperature of the atmosphere surrounding machine 10.

It will be apparent to those of ordinary skill in the art that various modifications and variations can be implemented with the methods of operating variable-speed engine 12 and the engine controls 22 for executing those methods without departing from the scope of the disclosure. Other embodiments will be apparent to those skilled in the art from consideration of the specification and practice of the methods of operating variable-speed engine 12 and engine controls 22 for executing those methods. It is intended that the disclosure of these embodiments be considered as exemplary only, with a true scope of the invention being indicated by the following claims and their equivalents.

What is claimed is:

1. Engine controls for a variable-speed engine, the engine controls comprising:
   a controller;
   a service interface; and
   wherein the engine controls are configured to:
      operate the variable-speed engine at a first preset idle speed under a first predetermined set of conditions;
      operate the variable-speed engine at a second preset idle speed under a second predetermined set of conditions;
      reset the first preset idle speed to a first new idle speed in response to the service interface transmitting to the controller a predetermined communication for resetting the first preset idle speed to the first new idle speed; and
      subsequently, operate the variable-speed engine at the first new idle speed under the first predetermined set of conditions.

2. The engine controls of claim 1, wherein the service interface is an off-board service tool configured to:

transmit the predetermined communication for resetting the first preset idle speed to the first new idle speed to the controller in response to manipulation of the off-board service tool in a predetermined manner.

3. The engine controls of claim 1, wherein the engine controls are further configured to:
reset the second preset idle speed to a second new idle speed in response to the service interface transmitting to the controller a predetermined communication for resetting the second preset idle speed to the second new idle speed; and
subsequently, operate the variable-speed engine at the second new idle speed under the second predetermined set of conditions.

4. The engine controls of claim 3, further including:
throttle controls; and
wherein the first predetermined set of conditions includes the throttle controls transmitting an idle-speed request and the second predetermined set of conditions includes the throttle controls transmitting an idle-speed request.

5. A method for controlling a variable-speed engine of a machine, the method comprising:
receiving inputs related to conditions of operation of the machine;
operating the variable-speed engine at a first idle speed in response to a first predetermined set of conditions;
operating the variable-speed engine at a second idle speed, lower than the first idle speed, in response to a second predetermined set of conditions;
operating the variable-speed engine at a third idle speed, higher than the first idle speed, in response to a third predetermined set of conditions, wherein the third predetermined set of conditions includes the inputs indicating the existence of predetermined conditions related to a charge level of a battery of the work machine.

6. The method of claim 5, wherein the third predetermined set of conditions includes the inputs indicating that a voltage level of the battery is below a predetermined level.

7. The method of claim 5, further including:
receiving a predetermined communication for disabling operation of the variable-speed engine at the third idle speed under the third predetermined set of conditions; and
subsequently, operating the variable-speed engine at either the first idle speed or the second idle speed in response to the third predetermined set of conditions.

8. The method of claim 5, further including:
operating the variable-speed engine at the third idle speed in response to a fourth predetermined set of conditions that includes the inputs indicating that at least one of an operating temperature of the machine and the temperature of the atmosphere surrounding the machine is below a predetermined temperature.

9. The method of claim 8, further including:
receiving a predetermined communication for disabling operation of the variable-speed engine at the third idle speed under the fourth predetermined set of conditions; and
subsequently, operating the variable-speed engine at either the first idle speed or the second idle speed in response to the fourth predetermined set of conditions.

10. A method for controlling a variable-speed engine of a machine that includes a park-brake, the method comprising:
receiving a signal indicating an engagement status of the park-brake;
operating the variable-speed engine at a first idle speed; and
operating the variable-speed engine at a second idle speed, lower than the first idle speed, only if the signal indicates that the park-brake is engaged.

11. The method of claim 10, further including:
receiving one or more signals related to a charge level of a battery of the machine; and
wherein operating the variable-speed engine at the second idle speed includes operating the variable-speed engine at the second idle speed only if the one or more signals related to the charge level of the battery indicate the existence of predetermined conditions related to the charge level of the battery.

12. The method of claim 10, further including:
receiving a signal indicating a voltage level of a battery of the machine; and
wherein operating the variable-speed engine at the second idle speed includes operating the variable-speed engine at the second idle speed only if the signal indicating the voltage level of the battery indicates that the voltage level of the battery is above a predetermined level.

13. The method of claim 10, wherein operating the variable-speed engine at the second idle speed includes operating the variable-speed engine at the second idle speed only after receiving the signal indicating that the park-brake is engaged and waiting for a predetermined delay period.

14. The method of claim 10, further including:
receiving at least one of a signal indicating an operating temperature of the machine and a signal indicating a temperature of the atmosphere surrounding the work machine; and
operating the variable-speed engine at a third idle speed, higher than the first idle speed, only after receiving at least one of a signal indicating that an operating temperature of the machine is below a predetermined temperature and a signal indicating that the temperature of the atmosphere surrounding the machine is below a predetermined temperature.

15. The method of claim 10, further including:
receiving one or more signals related to a charge level of a battery of the machine; and
operating the variable-speed engine at a third idle speed, higher than the first idle speed, only if the signals related to the charge level of the battery indicate the existence of predetermined conditions related to the charge level of the battery.

16. The method of claim 10, further including:
receiving a signal indicating a voltage level of a battery of the machine;
operating the variable-speed engine at a third idle speed, higher than the first idle speed, only if the signal indicating the voltage level of the battery indicates that the voltage level is below a predetermined level.

17. The method of claim 10, further including:
receiving a predetermined communication for resetting the second idle speed to a new idle speed; and
in response, resetting the second idle speed to the new idle speed.

18. The method of claim 10, further including:
receiving a signal indicating an operating state of a drive system of the machine;
wherein operating the variable-speed engine at the second idle speed includes operating the variable-speed engine at the second idle speed only if the signal indicating the operating state of the drive system indicates that the drive system is in an inactive operating state.

19. The method of claim 10, further including:
receiving a signals relating to an amount of power that a fan-drive system of the machine is drawing from the variable-speed engine; and
wherein operating the variable-speed engine at the second idle speed includes operating the variable-speed engine at the second idle speed only if the signals relating to the amount of power the fan-drive system is drawing indicate that the fan-drive system is drawing less than a predetermined amount of power from the variable-speed engine.

20. The method of claim 10, wherein operating the variable-speed engine at the second idle speed includes operating the variable-speed engine at the second idle speed only if throttle controls of the machine are transmitting an idle-speed request.

21. The method of claim 10, further including:
receiving inputs indicating whether an operator is manipulating implement controls of the machine to request operation of an implement of the machine; and
wherein operating the variable-speed engine at the second idle speed includes operating the variable-speed engine at the second idle speed only if the signals indicating whether an operator is manipulating the implement controls to request operation of an implement of the machine indicate that an operator is not manipulating the implement controls to request operation of an implement of the machine.

22. Engine controls configured to control the operating speed of a variable speed engine of a machine according to the method of claim 10.

23. The method of claim 10, further including:
receiving at least one of a signal indicating an operating temperature of the machine and a signal indicating a temperature of the atmosphere surrounding the machine; and
wherein operating the variable-speed engine at the second idle speed includes operating the variable-speed engine at the second idle speed only after receiving at least one of a signal indicating that an operating temperature of the machine is above a predetermined temperature and a signal indicating that the temperature of the atmosphere surrounding the machine is above a predetermined temperature.

24. The method of claim 23, further including:
receiving a signal indicating the voltage level of a battery of the machine; and
wherein operating the variable-speed engine at the second idle speed includes operating the variable-speed engine at the second idle speed only if the signal indicating the voltage level of the battery indicates that the voltage level of the battery is above a predetermined level.

25. The method of claim 23, further including:
receiving one or more signals related to a charge level of a battery of the machine; and
wherein operating the variable-speed engine at the second idle speed includes operating the variable-speed engine at the second idle speed only if the one or more signals related to the charge level of the battery indicate the existence of predetermined conditions related to the charge level of the battery.

26. The method of claim 25, wherein operating the variable-speed engine at the second idle speed includes operating the variable-speed engine at the second idle speed only after receiving the signal indicating that the park-brake is engaged and waiting for a predetermined delay period.

* * * * *